(12) United States Patent
Albero et al.

(10) Patent No.: US 12,323,431 B2
(45) Date of Patent: Jun. 3, 2025

(54) MULTI-CHANNEL COMMUNICATION AUTHENTICATION AND VALIDATION

(71) Applicant: Bank of America Corporation, Charlotte, NC (US)

(72) Inventors: George Anthony Albero, Charlotte, NC (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/368,210

(22) Filed: Sep. 14, 2023

(65) Prior Publication Data

US 2025/0097234 A1 Mar. 20, 2025

(51) Int. Cl.
*H04L 67/141* (2022.01)
*H04L 9/40* (2022.01)

(52) U.S. Cl.
CPC ............ *H04L 63/12* (2013.01); *H04L 67/141* (2013.01)

(58) Field of Classification Search
CPC ................ H04L 67/141; H04L 51/046; H04M 3/42068; H04M 3/42042
See application file for complete search history.

(56) References Cited

U.S. PATENT DOCUMENTS

| 10,178,230 | B1 * | 1/2019 | Seay | H04L 65/1104 |
| 10,970,394 | B2 | 4/2021 | Kedem et al. | |
| 11,240,272 | B2 | 2/2022 | Albero et al. | |
| 11,425,563 | B2 | 8/2022 | Turgeman et al. | |
| 11,606,353 | B2 | 3/2023 | Zaloum et al. | |
| 2005/0143103 | A1 * | 6/2005 | Bjorgan | H04L 65/1089 455/567 |
| 2011/0319061 | A1 * | 12/2011 | Schmackpfeffer | H04L 51/224 455/415 |
| 2016/0381214 | A1 * | 12/2016 | Messenger | H04M 15/70 455/415 |
| 2020/0314247 | A1 * | 10/2020 | Klingler | H04M 3/54 |
| 2021/0144521 | A1 * | 5/2021 | Saifee | H04M 3/42102 |
| 2022/0329694 | A1 * | 10/2022 | Murphy | H04M 3/436 |
| 2024/0048654 | A1 * | 2/2024 | Seay | H04M 3/42068 |

* cited by examiner

*Primary Examiner* — Johnny B Aguiar
(74) *Attorney, Agent, or Firm* — Banner & Witcoff, Ltd.

(57) ABSTRACT

Arrangements for multi-channel communication validation are provided. In some examples, an indication of initiation of a communication session may be received. The communication session may be initiated by a first party via a first communication channel. In response to the indication, one or more validation actions may be generated and sent to a user device associated with a second party or recipient of the communication session via a second, different communication channel. The second party may acknowledge the validation action and a call completion action may be generated and transmitted to a computing device of the first party. The call completion action may include enabling a connection of the communication session between the first party and the second party if the second party has accepted the call, or may terminate the communication session if the second party has rejected the call.

16 Claims, 10 Drawing Sheets

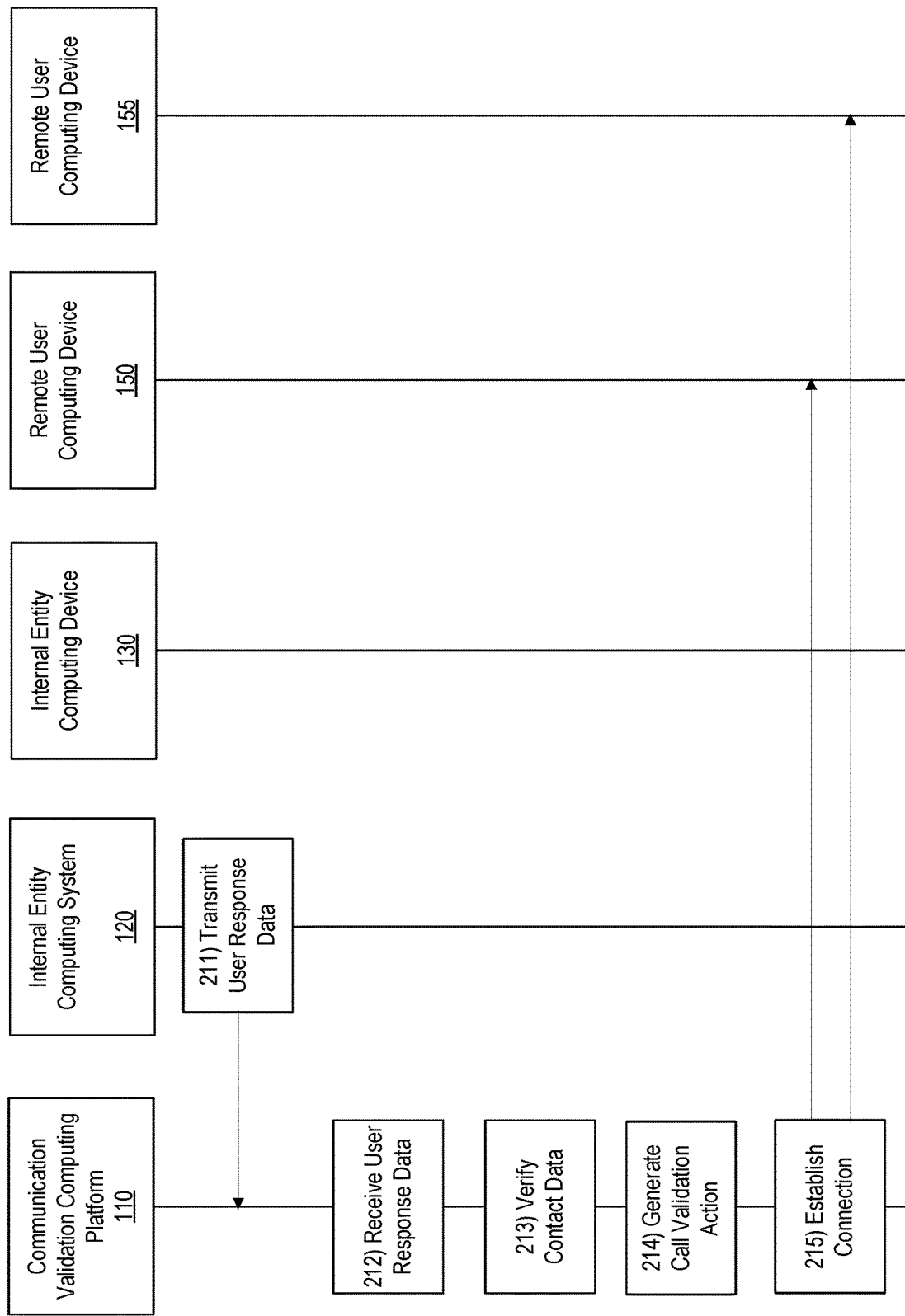

To: Customer  400

From: Enterprise Organization

Subject: Incoming Phone Call

Dear Customer,

This notification is to indicate that Enterprise Organization has initiated or will shortly be initiating a phone call to you. This notification serves to confirm that the incoming call you will receive is indeed from the Enterprise Organization.

Thank you!

| *No, Thanks* | OK |

Welcome, Customer Name!

Please Note:

A Validated Call Was Initiated or Will Be Initiated To The Phone Number On Record For you.

This notification serves to confirm that the incoming call you will receive is indeed from the Enterprise Organization.

| *No, Thanks* | OK |

FIG. 5

MULTI-CHANNEL COMMUNICATION AUTHENTICATION AND VALIDATION

BACKGROUND

Aspects of the disclosure relate to electrical computers, systems, and devices providing multi-channel communication authentication and validation.

As generative artificial intelligence becomes more readily available, the use of deep fakes by or other vishing techniques are also becoming more prevalent and more difficult to identify. In particular, calls received by a user that purport to be from a trusted enterprise organization may, in fact, be unauthorized actors attempting to obtain funds, personal information, and the like, from users by using deep fakes or other voice imitation generating using artificial intelligence. Accordingly, it would be advantageous to provide a system for validating a call or origination of a call or other communication.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated validating a connection between two or more parties.

In some examples, an indication of initiation of a communication session may be received. The communication session may be initiated by a first party via a first communication channel. In response to the indication, one or more validation actions may be generated and sent to a user device associated with a second party or recipient of the communication session via a second, different communication channel. The second party may acknowledge the validation action and a call completion action may be generated and transmitted to a computing device of the first party. The call completion action may include enabling a connection of the communication session between the first party and the second party if the second party has accepted the call, or may terminate the communication session if the second party has rejected the call.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for implementing communication validation in accordance with one or more aspects described herein;

FIGS. 4 and 5 illustrate example graphical user interfaces that may be generated in accordance with one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, identifying instances of vishing or other attempted fraudulent acts is becoming more difficult with the use of generative artificial intelligence. For instance, robocalls may use deep fakes or other voice imitation to enable widespread attempts to obtain user data, funds, or the like through fraudulent means.

Accordingly, aspects described herein provide systems and arrangements for validating a communication, such as telephone call initiated by an enterprise organization to a customer of the enterprise organization. Accordingly, the validation may provide assurance to the customer that the call did, in fact, originate from the trusted enterprise organization and is not from a fraudulent actor posing as the enterprise organization. In some examples, the validation of the call may indicate that the call itself is validated but might not impact authentication of a user (e.g., a user may still have to provide authenticating data to the enterprise organization during the call).

In order to validate the call or communication, aspects herein are directed to generating and transmitting a validation action that may be sent to a user via a communication channel different from the communication channel used to initiate the communication. For instance, if the communication is initiated as a telephone call over a telephone communication channel, the validate action may be sent to the user via a different communication channel, such as email, short message service (SMS), via a mobile or web-based application of the enterprise organization, via a virtual assistant of the enterprise organization, or the like. In some examples, the initiated communication may be paused or temporarily blocked until the customer acknowledges the validation action, at which time the call or other communication may be enabled and the enterprise organization may connect to the user.

These and various other arrangements will be discussed more fully below.

Figure 1A:
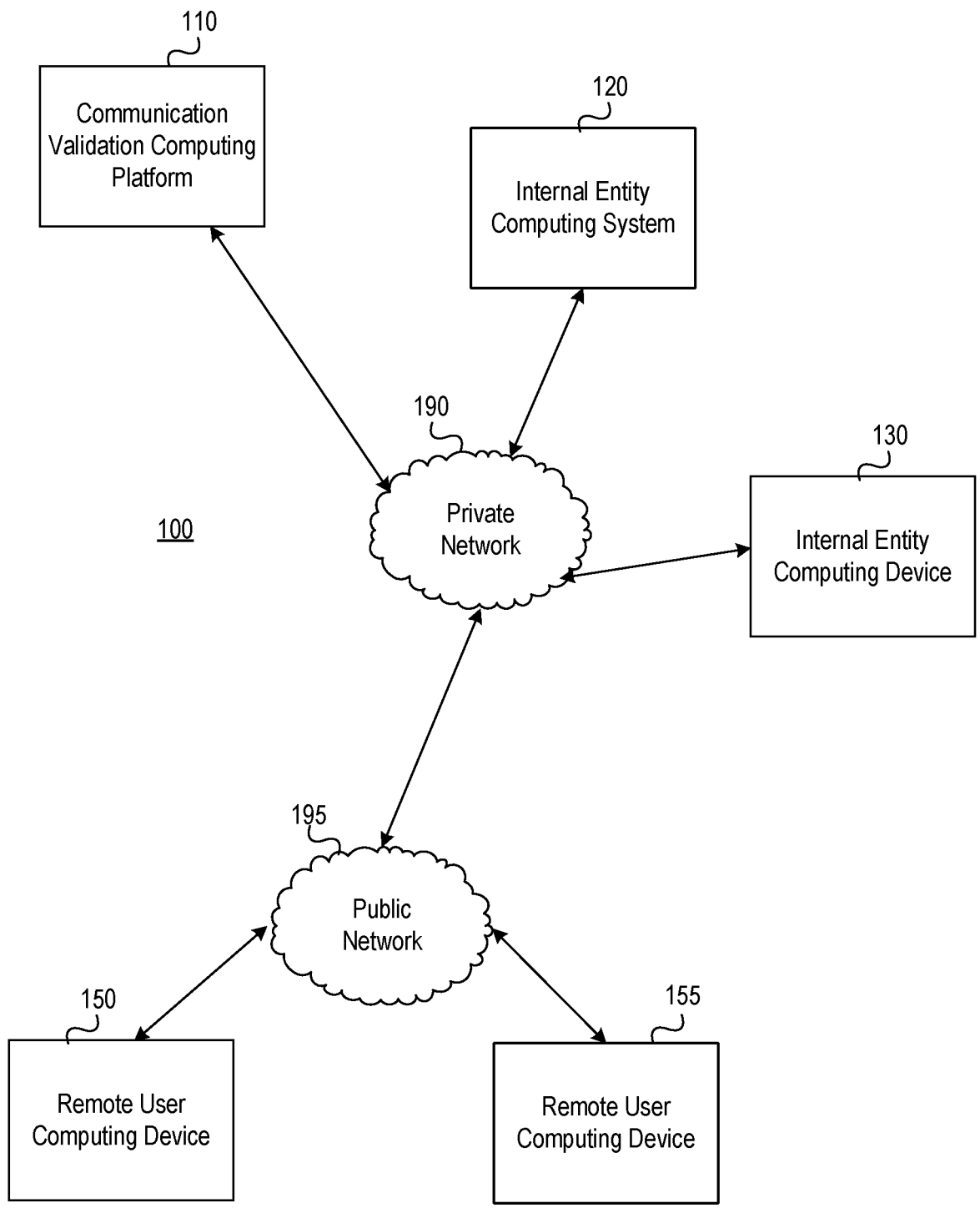
FIGS. 1A-1B depict an illustrative computing environment for implementing multi-channel communication authentication and validation in accordance with one or more aspects described herein.
Figure 1B:
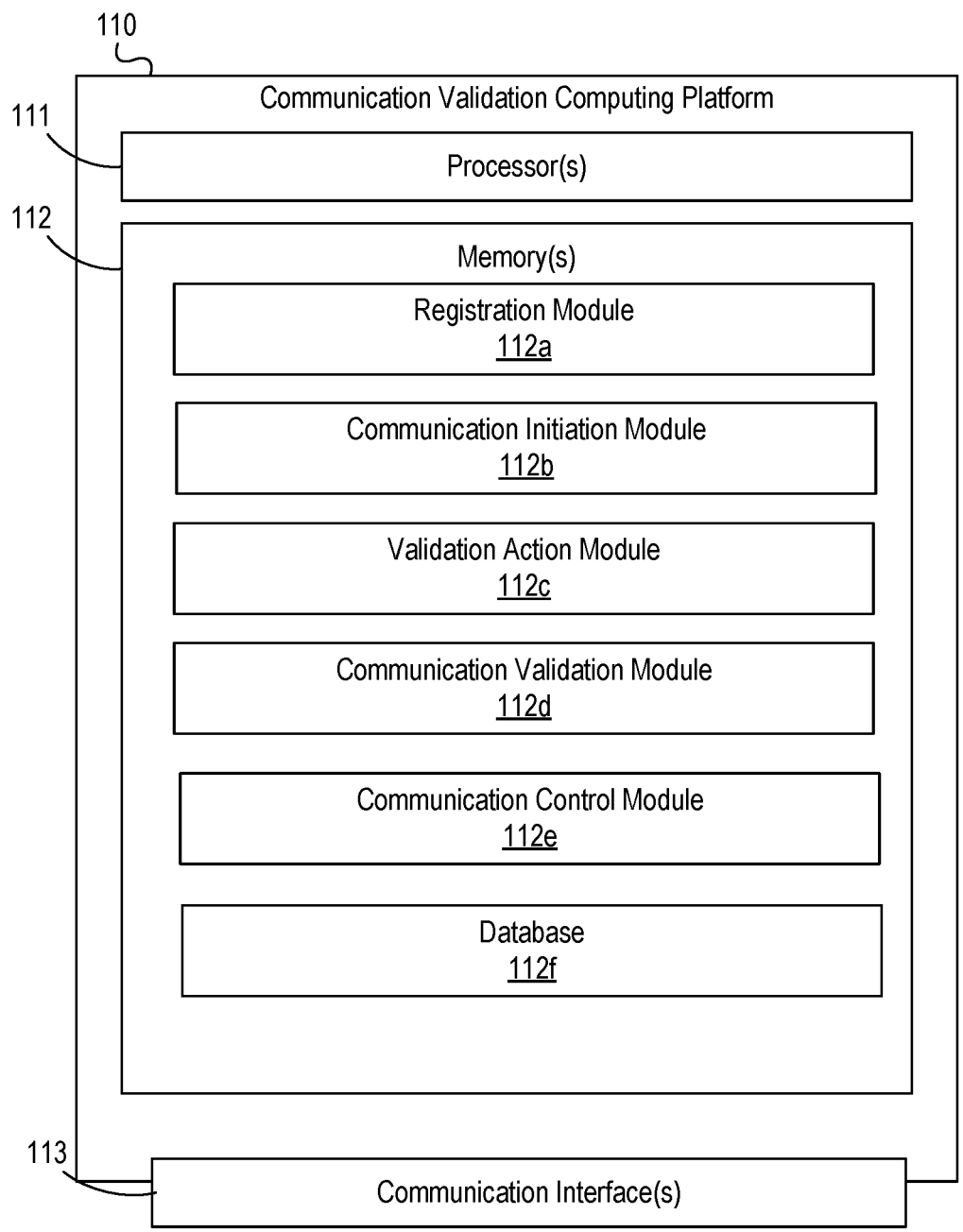

FIGS. 1A-1B depict an illustrative computing environment for implementing multi-channel communication authentication in accordance with one or more aspects described herein. Referring to FIG. 1A, computing environment 100 may include one or more computing devices and/or other computing systems. For example, computing environment 100 may include communication validation computing platform 110, internal entity computing system 120, internal entity computing device 130, remote user computing device 150 and remote user computing device 155. Although one internal entity computing system 120, one internal entity computing device 130 and two remote user computing devices 150, 155 are shown, more or fewer devices or systems may be used without departing from the invention. Further, while communication validation computing platform 110 is shown as a separate device from internal entity computing system 120, in some examples, communication validation computing platform 110 and internal entity computing system 120 may be part of a same device.

Communication validation computing platform 110 may be or include one or more computing devices (e.g., servers, server blades, or the like) and/or one or more computing components (e.g., memory, processor, and the like) and may be configured to provide dynamic, efficient multi-channel communication validation and authentication. For instance, communication validation computing platform 110 may receive an indication of initiation of a communication via a first communication channel. For instance, an enterprise organization associated with communication validation computing platform 110 may initiate a telephone call to a user (e.g., a customer of the enterprise organization). The telephone call may be initiated using internal entity computing system 120, internal entity computing device 130, or a device in communication with internal entity computing system 120 and/or internal entity computing device 130.

Upon receiving the indication of the communication initiation, communication validation computing platform 110 may generate a communication validation action. For instance, communication validation computing platform 110 may generate a validation action that may be transmitted to the user (e.g., recipient of the initiated communication) via a second communication channel different from the first communication channel. For instance, a notification may be sent via one or more of email, SMS, or the like, to a preregistered email address or phone number of the user. The notification may include an indication that the enterprise organization has or will be initiating a communication via the first communication channel and that the notification is provided as validation of the communication initiated.

In another example, a notification may be transmitted to the user via a second communication channel indicating that the user should login to a mobile or web-based application associated with the enterprise organization. Upon successful login, a notification may be presented indicating that the communication initiated or being initiated via the first communication channel is validated. Additionally or alternatively, the user may request confirmation of validation of the initiated communication via a virtual assistant associated with the enterprise organization.

In still other examples, the notification action may include a tonal key transmitted to the user via one or more communication channels. Upon detection of the tonal key at a receiving device, a notification may be transmitted back to the communication validation computing platform 110 indicating that the user has received the validation notification.

In some examples, communication validation computing platform 110 may receive, from the user, confirmation of the validation action. For instance, the user may provide a response via email or SMS, may provide user input via the mobile or web-based application, or the like, acknowledging the validation action. Upon receiving the acknowledgment, the communication validation computing platform 110 may authorize or enable the initiated communication and, for instance, may connect the initiating device to the user device, or enable the connection (e.g., remove a pause or temporary block placed on the call).

Internal entity computing system 120 may be or include one or more computing devices (e.g., servers, server blades, or the like) and/or one or more computing components (e.g., memory, processor, and the like) and may be configured to host or execute one or more application associated with the enterprise organization, such as customer facing application (e.g., a web-based or mobile application), internal applications associated with user accounts, customer data management, or the like. In some examples, internal entity computing system 120 may store customer registration data including pre-stored contact information including email addresses, phone numbers, user authentication data, or the like.

Internal entity computing device 130 may be or include computing devices such as desktop computers, laptop computers, tablets, smartphones, wearable devices, and the like, that may be associated with an enterprise organization user (e.g., a customer service associate or other associate of the enterprise organization). Internal entity computing device 130 may be used to initiate a communication with a user or customer of the enterprise organization, or the like. For instance, the customer service associate may initiate, via the first communication channel and via the internal entity computing device 130, communication with the user or customer that may then cause the indication of the communication to be transmitted to communication validation computing platform 110.

Remote user computing device 150 and/or remote user computing device 155 may be or include computing devices such as desktop computers, laptop computers, tablets, smartphones, wearable devices, and the like, that may be associated with a user or customer (e.g., a customer of the enterprise organization). Remote user computing device 150 may be a device associated with a same user as associated with remote user computing device 155, or a different user. Remote user computing device may, in some examples, receive the communication initiated via the first communication channel, as well as the validation action received via the second communication channel. Additionally or alternatively, if remote user computing device 150 and remote user computing device 155 are associated with a same user, one of remote user computing device 150 or remote user computing device 155 may receive the communication via the first channel and the other of remote user computing device 150 or remote user computing device 155 may receive the validation action via the second communication channel.

As mentioned above, computing environment 100 also may include one or more networks, which may interconnect one or more of communication validation computing platform 110, internal entity computing system 120, internal entity computing device 130, remote user computing device 150 and/or remote user computing device 155. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, communication validation computing platform 110, internal entity computing system 120, and/or internal entity computing device 130, may be associated with an enterprise organization (e.g., a financial institution), and private network 190 may be associated with and/or operated by the organization, and may include one or more networks (e.g., LANs, WANs, virtual private networks (VPNs), or the like) that interconnect communication validation computing platform 110, internal entity computing system 120, and/or internal entity computing device 130, and one or more other computing devices and/or computer systems that are used by, operated by, and/or otherwise associated with the organization. Public network 195 may connect private network 190 and/or one or more computing devices connected thereto (e.g., communication validation computing platform 110, internal entity computing system 120, internal entity computing device 130) with one or more networks and/or computing devices that are not associated with the organization. For example, remote user computing device 150 and/or remote user computing device 155 might not be associated with an organization that operates private network 190 (e.g., because remote user computing device 150 and/or remote user computing device 155 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote users computing device 150 and/or remote user computing device 155 to private network 190 and/or one or more computing devices connected thereto (e.g., communication validation computing platform 110, internal entity computing system 120, internal entity computing device 130).

Referring to FIG. 1B, communication validation computing platform 110 may include one or more processors 111, memory 112, and communication interface 113. A data bus may interconnect processor(s) 111, memory 112, and communication interface 113. Communication interface 113 may be a network interface configured to support communication between communication validation computing platform 110 and one or more networks (e.g., network 190, network 195, or the like). Memory 112 may include one or more program modules having instructions that when executed by processor(s) 111 cause communication validation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of communication validation computing platform 110 and/or by different computing devices that may form and/or otherwise make up communication validation computing platform 110.

For example, memory 112 may have, store and/or include registration module 112a. Registration module 112a may store instructions and/or data that may cause or enable the communication validation computing platform 110 to receive, from one or more users or customers, a request to register with the communication validation computing platform 110. For instance, at a time when a user opens an account with the enterprise organization, or at any time after, the user may opt in or request registration with the communication validation computing platform 110. The user or customer may provide registration data including name or other identifier, contact information (e.g., address, email address, cell phone number, or the like). In some examples, the registration data may include an indication of a mobile or web-based application login or account information associated with the user. The registration data may be stored by registration module 112a and/or by a database, such as database 112f.

Communication validation computing platform 110 may further have, store and/or include communication initiation module 112b. Communication initiation module 112b may store instructions and/or data that may cause or enable the communication validation computing platform 110 to receive an indication that a communication has been initiated via a first communication channel and initiate communication validation actions in response. For instance, based on receiving the indication of initiation of the communication, communication initiation module 112b may, in some examples, temporarily pause or block the initiated communication from being completed while one or more validation actions are generated and sent to the user or customer.

For instance, validation action module 112c may store instructions and/or data that may cause or enable the communication validation computing platform 110 to generate one or more validation actions in response to the indication of initiation of the communication via the first communication channel. In some examples, validation action module 112c may generate one or more validation actions and transmit the generated validation actions to the user or customer via one or more second communication channels different from the first communication channel (e.g., if the first communication channel is a telephone call, the validation action may be transmitted via email, SMS, an instruction to login to a mobile or web-based application, via a virtual assistant associated with the enterprise organization, or the like). Validation action module 112c may transmit or send the one or more validation actions to the user device (e.g., remote user computing device 150 and/or remote user computing device 155). In some examples, validation actions may be generated on a rolling or random basis (e.g., a different validation action may be generated dynamically to avoid predictability of the validation action).

Communication validation computing platform 110 may further have, store and/or include communication validation module 112d. Communication validation module 112d may store instructions and/or data that may cause or enable the communication validation computing platform 110 to receive an acknowledgement or acceptance of the validation action from the user or customer device (e.g., remote user computing device 150 and/or remote user computing device 155) and may then validate the communication. In some examples, validating the communication may include generating an instruction to enable or connect the communication initiated via the first communication channel.

For instance, the instruction to enable or connect the communication may be sent to communication control module 112e which may store instructions and/or data that may cause or enable the communication validation computing platform 110 to remove any temporary pause or block on the initiated communication and permit or enable connection of the initiated communication via the first communication channel (e.g., enable the initiated telephone call to be completed to the receiving phone number of the customer or user).

Communication validation computing platform 110 may further have, store and/or include a database 112f. Database 112f may store data associated with user registration, completed communications, validation of communications, and/or other data that enables performance of the aspects described herein by the communication validation computing platform 110.

FIGS. 2A-2E depict one example illustrative event sequence for implementing communication validation in accordance with one or more aspects described herein. The events shown in the illustrative event sequence are merely one example sequence and additional events may be added, or events may be omitted, without departing from the invention. Further, one or more processes discussed with respect to FIGS. 2A-2E may be performed in real-time or near real-time.

Figure 2A:
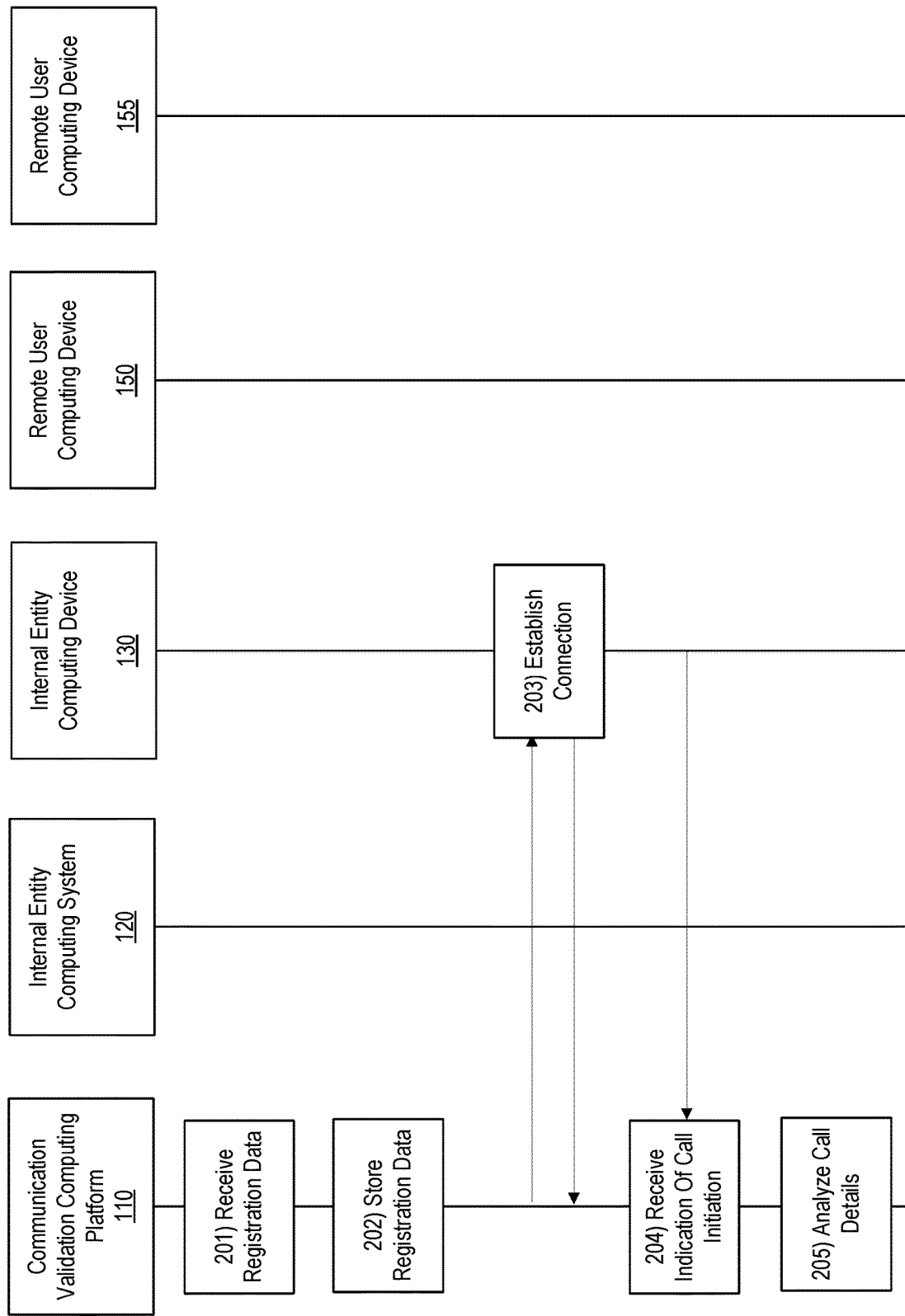

With reference to FIG. 2A, at step 201, communication validation computing platform 110 may receive registration data. For instance, data from one or more users or customers including a request to register with the communication validation computing platform 110 may be received by the communication validation computing platform 110. In some examples, the registration data may include name or other identifier of each user, contact information of each user (e.g., email address, cell phone number, or the like), any user preferences, identification one or more mobile or web-based application accounts the user has already established with the enterprise organization, or the like.

At step 202, the communication validation computing platform 110 may store the registration data. For instance, one or more databases may be modified to include data elements associated with the users requesting registration, the received registration data, and the like.

At step 203, internal entity computing device 130 may establish a connection with the communication validation computing platform 110. For instance, a first wireless connection may be established between the internal entity computing device 130 and the communication validation computing platform 110. Upon establishing the first wireless connection, a communication session may be initiated between the internal entity computing device 130 and the communication validation computing platform 110.

At step 204, communication validation computing platform 110 may receive an indication of initiation of a communication via a first communication channel. For instance, communication validation computing platform 110 may receive, from internal entity computing device 130, an indication that a call (e.g., a telephone call) to a user or customer has been initiated or will be initiated (e.g., within a predetermined time period). The indication may include call details including information identifying a destination device or expected recipient of the call.

At step 205, the communication validation computing platform 110 may analyze the call details to identify a recipient of the call or destination device. For instance, the call details may be parsed or otherwise analyzed to identify an end user or customer to whom the call is being placed.

Figure 2B:
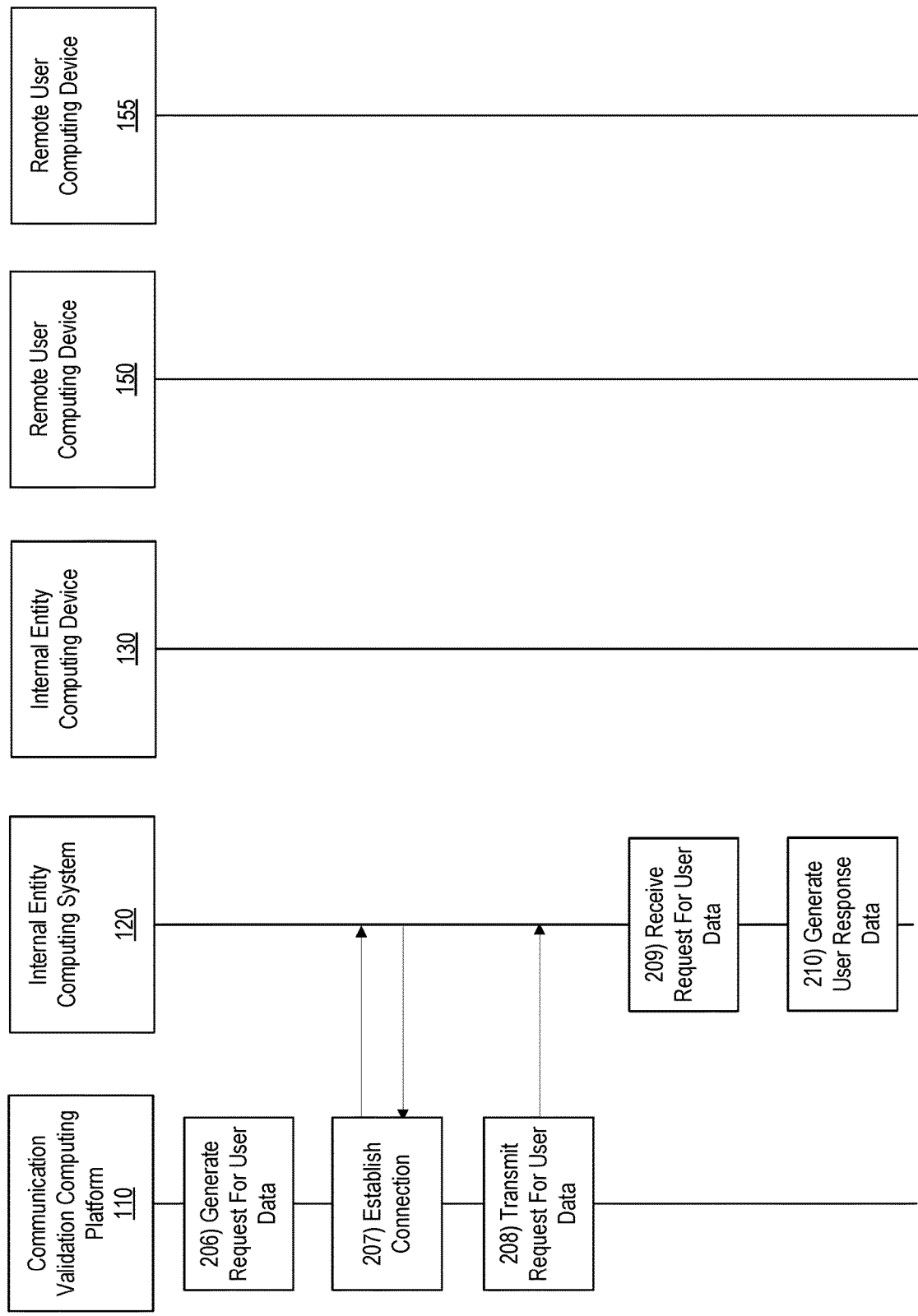

With reference to FIG. 2B, at step 206, communication validation computing platform 110 may generate a request for user data. For instance, based on identifying the user or customer that is the intended recipient of the initiated call or communication, communication validation computing platform 110 may generate a request for user or customer data associated with the identified user.

At step 207, communication validation computing platform 110 may establish a connection with the internal entity computing system 120. For instance, a second wireless connection may be established between the communication validation computing platform 110 and the internal entity computing system 120. Upon establishing the second wireless connection, a communication session may be initiated between the communication validation computing platform 110 and the internal entity computing system 120.

At step 208, the communication validation computing platform 110 may transmit or send the request for user information to the internal entity computing system 120. For instance, the communication validation computing platform 110 may transmit or send the request for user data during the communication session initiated upon establishing the second wireless connection.

At step 209, the internal entity computing system 120 may receive and execute the request for user data. For instance, the internal entity computing system 120 may identify user contact information (e.g., pre-registered email address, phone number, or the like), user account information, and the like.

At step 210, the internal entity computing system 120 may generate user response data based on the retrieved user data.

With reference to FIG. 2C, at step 211, the internal entity computing system 120 may transmit or send the user response data to the communication validation computing platform 110. At step 212, the communication validation computing platform 110 may receive the user response data.

At step 213, communication validation computing platform 110 may verify the user data. For instance, communication validation computing platform 110 may verify the user data by comparing the user response data to user data provided during the registration process. Accordingly, this may provide an additional layer of security for users of the system. For instance, the communication validation computing platform 110 may determine whether contact information (e.g., email address, cell phone number, or the like) received during registration matches contact information stored via other systems of the enterprise organization. If so, the process may proceed. If not, the process may end and the initiated call may be terminated.

In some examples, such as when the communication validation computing platform 110 and the internal entity computing system 120 are part of a same device, one or more of steps 206-213 may be omitted.

At step 214, communication validation computing platform 110 may generate one or more call validation actions. For instance, validation action module 112c may generate one or more call validation actions that may be used to validate an incoming call to a user or customer (e.g., to verify to the user or customer that an incoming call is from the actual enterprise organization and not from an unauthorized actor posing as the enterprise organization). In some examples, the one or more call validation actions may include generating and transmitting a notification of the incoming call to known contact information of the user (e.g., verified contact data, registration data, data from other internal systems, or the like). For example, an email or SMS may be sent to a known email address of the user, a known cell phone number of the user, or the like. The notification may indicate that the enterprise organization has initiated or will be initiating a call to the user or customer and confirming that the call is validated and made by the validated enterprise organization. FIG. 4 includes one example notification that may be transmitted via email to the user. The notification 400 includes an indication that the user or customer should be expecting an incoming call from the enterprise organization and that the call is validated to assure the customer that it is not an unauthorized actor posing as the enterprise organization. Further, the notification includes an option to accept the call (e.g., "OK") or decline ("No, Thanks"). The user may select one of the options provided in notification 400 and that data may be transmitted to the communication validation computing platform 110 (e.g., to connect or terminate the initiated call).

Additionally or alternatively, validation action module 112c may include transmission of a secure link to an enterprise organization website or a direct phone number that the user may receive or already be aware of and can access to validate the incoming call. For instance, the secure link or phone number may be provided via a mobile or web-based application, or via an email or other message received by the user confirming registration with the communication validation system. Accordingly, the user may (e.g., upon receiving the initiated call or upon receiving a notification of an expected call) access the link or phone number (e.g., click the link or call the phone number) and an automated message may indicate that there is a call expected to the user and it is validated. If not call has been initiated or expected to be initiated to the user, the automated message may reflect that information and the user or customer may then disregard or ignore the call, report the potential fraud, or the like.

In still other additional or alternative examples, validation action module 112c may provide an indication via an online or mobile banking application that may indicate the call has been or will be initiated to the user or customer. For instance, upon receiving the call or a notification of an expected call, the user may log in to the mobile or web-based application associated with the enterprise organization and a notification may be displayed indicating that the call is from the enterprise organization and has been validated. FIG. 5 illustrates one example notification 500 that may be provided via a mobile application. The notification 500 may include a pop-up or other overlay of a home screen upon authentication of the user. The pop-up or overlay may indicate that the user or customer should be expecting an incoming call from the enterprise organization and that the call is validated to assure the customer that it is not an unauthorized actor posing as the enterprise organization. Further, the notification includes an option to accept the call (e.g., "OK") or decline ("No, Thanks"). The user may select one of the options provided in notification 500 and that data may be transmitted to the communication validation computing platform 110 (e.g., to connect or terminate the initiated call).

Additionally or alternatively, the user may activate a virtual assistant associated with the enterprise organization and, upon authenticating or upon inquiring about an incoming call, the virtual assistant may confirm (e.g., via communication validation computing platform 110 and/or internal entity computing system 120 hosting the virtual assistant) that the call is or is not validated and may communicate that information to the user (e.g., via voice or text data output).

In still other additional or alternative examples, a tonal key may be embedded in the outgoing call from the enterprise organization. For instance, different tonal bits may be embedded in a communication to the user. The tonal bits may be used to validate that the call is actually coming from the trusted enterprise organization and not from an unauthorized actor. In some examples, the tonal key may include a frequency that is audible to the user, which may then indicate to the user that the call is validated. In some examples, the user may provide voice input, select a key, or the like, to indicate that the tonal key was received and to accept the call. Alternatively, if the tonal key is not heard by the user, the user may terminate the call.

Additionally or alternatively, the tonal key may include a frequency that is not audible to the user. Instead, a signal may be transmitted from the user device to the communication validation computing platform 110 indicating that the user device received the tonal key and acknowledging that the communication is validated.

At step 215, communication validation computing platform 110 may establish a connection with the remote user computing device 150 and/or remote user computing device 155. For instance, a third and fourth wireless connection may be established between the communication validation computing platform 110 and the remote user computing device 150, and the remote user computing device 155, respectively. Upon establishing the third and fourth wireless connections, communication sessions may be initiated between the communication validation computing platform 110 and the remote user computing device 150 and/or remote user computing device 155.

Figure 2D:
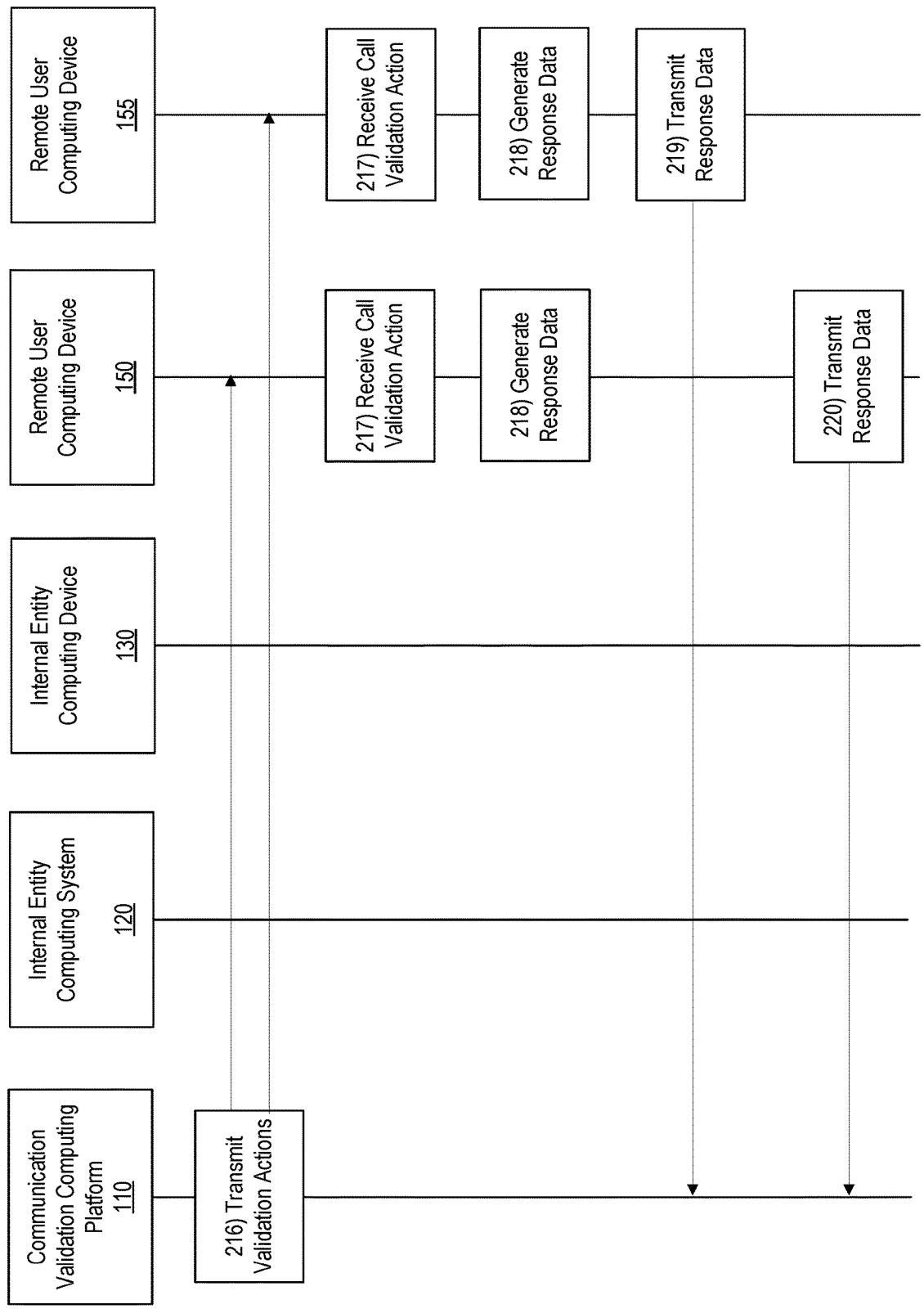

With reference to FIG. 2D, at step 216, the generated one or more call validation actions may be transmitted by the communication validation computing platform 110 to one or more user devices, such as remote user computing device 150 and/or remote user computing device 155. In some examples, different types of call validation actions may be sent to different types of devices. For instance, a notification sent via SMS may be transmitted to a tablet or smartphone of a user, while an indication to log in to a web-based application may be sent via email to a tablet or smartphone, as well as a laptop device of the user. Although the call validation actions are shown as transmitted to more than one device, in some examples, the call validation action may be transmitted or sent to only one device of a user (e.g., via one or more channels different from the communication channel used to initiate the call). Further, in some examples, while the call validation action may be sent to a first device of a user (e.g., remote user computing device 150) the user may provide response data or otherwise acknowledge the notification via a second device of the user (e.g., remote user computing device 155).

At step 217, the call validation actions may be received by one or more of remote user computing device 150 and/or remote user computing device 155. The one or more of remote user computing device 150 and/or remote user computing device 155 may execute any received call validation actions (e.g., display one or more notifications, request user login via a mobile or web-based application, or the like).

At step 218, remote user computing device 150 and/or remote user computing device 155 may generate response data. For instance, the call validation actions may be executed and, in some examples, user input may be received by a respective device acknowledging the validation action, accepting or declining the call or intended call, or the like. This user input may be used to generate response data for one or more of remote user computing device 150 and/or remote user computing device 155.

At step 219, remote user computing device 155 may transmit or send any generated response data to communication validation computing platform 110. At step 220, remote user computing device 150 may transmit or send any generated response data to communication validation computing platform 110.

Although the arrangements shown illustrate call validation actions being sent to both remote user computing device 150 and remote user computing device 155, as well as respond data being generated and transmitted by both remote user computing device 150 and remote user computing device 155, in some examples, call validation actions may be transmitted to only one of remote user computing device 150 or remote user computing device 155, or one or more other devices in addition to remote user computing device 150 and remote user computing device 155, without departing from the invention.

Figure 2E:
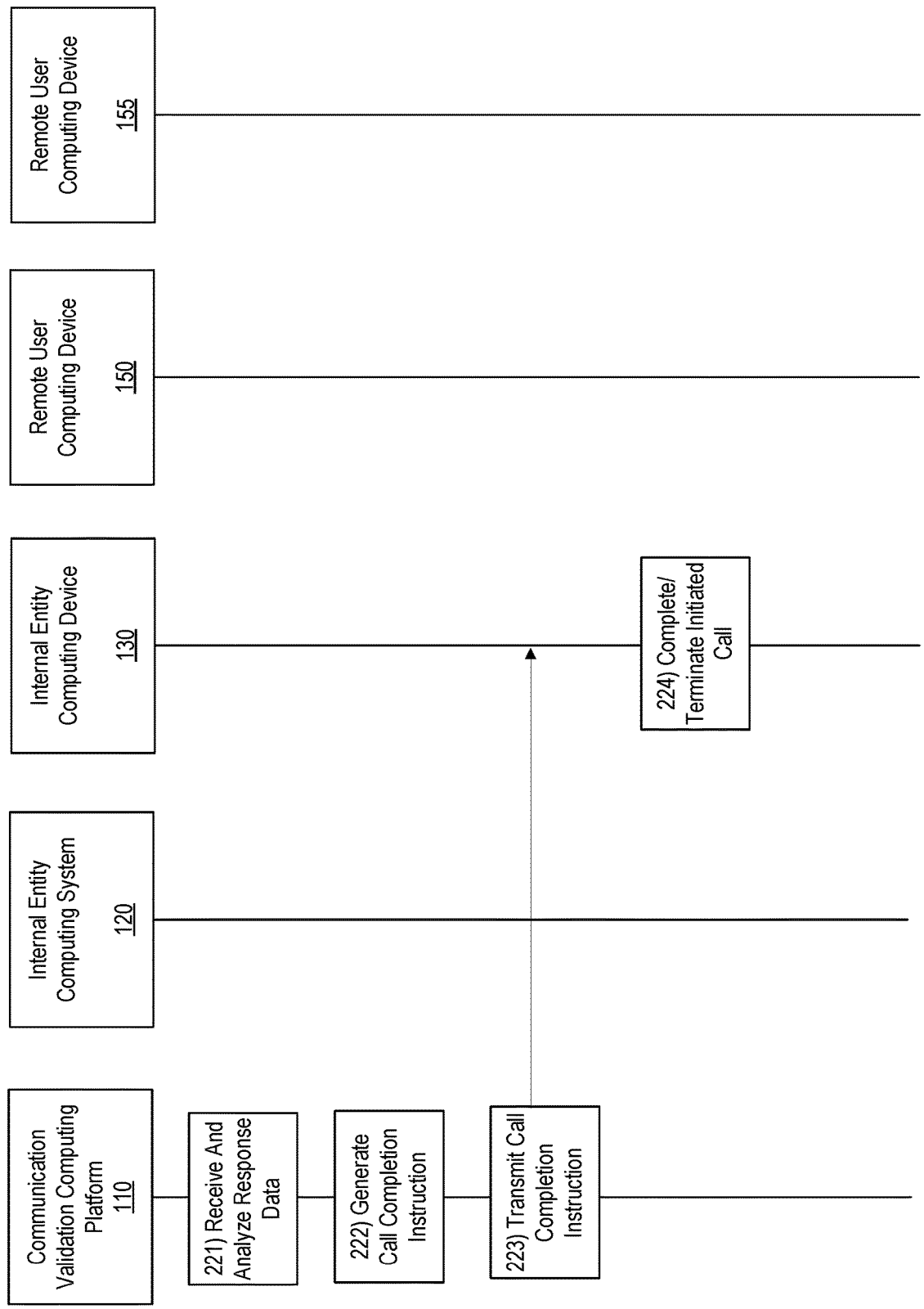

With reference to FIG. 2E, at step 221, communication validation computing platform 110 may receive the response data (e.g., from one or more of remote user computing device 150 and/or remote user computing device 155) and analyze the response data (e.g., to extract user input provided to accept or decline the initiated call).

Based on the analyze response data, at step 222, communication validation computing platform 110 may generate a call completion instruction. For instance, communication validation computing platform 110 may, based on whether the user has accepted or acknowledged the call, or declined the call, the communication validation computing platform 110 may generate a call completion instruction to either enable the call and connect or complete the initiated call or terminate the initiated call.

At step 223, the communication validation computing platform 110 may transmit or send the call completion instruction to the internal entity computing device 130 (e.g., the call initiating device).

At step 224, internal entity computing device 130 may receive and execute the instruction to either complete the call and connect to the user or customer, or terminate the initiated call.

Figure 3:
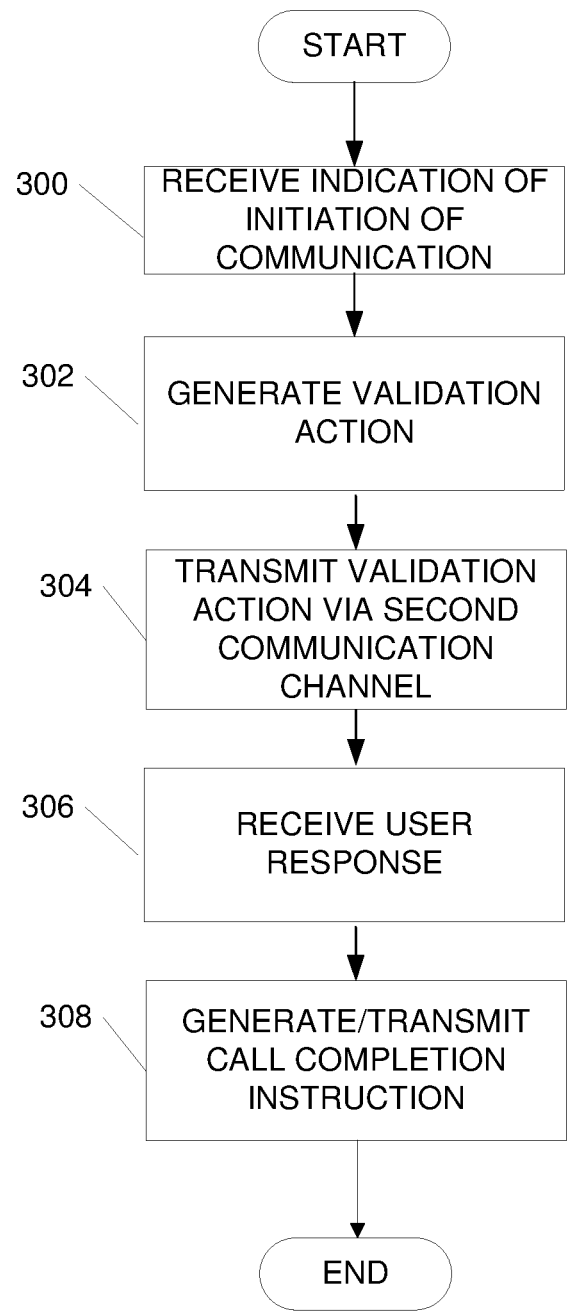
FIG. 3 depicts an illustrative method for implementing communication validation in accordance with one or more aspects described herein.

FIG. 3 is a flow chart illustrating one example method of communication validation in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform may receive an indication of initiation of a communication session between a first party and a second party. In some examples, the first party may be an enterprise organization and the second party may be a customer of the enterprise organization. In some arrangements, the communication session may be initiated by the first party via a first party computing device and via a first communication channel, such as a telephone call.

At step 302, the computing platform may generate a communication validation action in response to the received indication. In some examples, the initiated communication session may be paused or temporarily blocked until a communication validation is completed (e.g., the call may be initiated to the second party but not completed (e.g., not connected) until validation is performed). In some examples, the validation action may include a notification indicating that the call is from a trusted entity (e.g., the enterprise organization) and not an unauthorized actor posing as the enterprise organization. In some examples, the validation action may include a tonal key embedded in the initiated communication.

At step 304, the computing platform may transmit the generated validation action to the second party via a second communication channel different from the first communication channel. In some examples, transmitting the validation action may cause display of the notification included in the validation action on a computing device of the second party via the second communication channel. In some examples, the second communication channel may include an email channel, a short message service (SMS) channel, a mobile or web-based application of the first party, a virtual assistant associated with the first party, or the like.

At step 306, the computing platform may receive, from the second party computing device, user input responsive to the notification/validation action. For instance, the computing platform may receive user input from the second party including an indication of acceptance or rejection of the initiated communication session.

Responsive to receiving the user input, at step 308, the computing platform may generate a call completion instruction and transmit the call completion instruction to the first party computing device (e.g., the device that initiated the communication session). In some examples, transmitting the call completion action to the first party computing device may cause the first party computing device to complete the initiated communication session between the first party and the second party if the user input indicates acceptance, or terminate the initiated communication session between the first party and the second party if the user input indicates rejection.

As discussed, arrangements described provide validation of communications between a first party and a second party. For instance, the arrangements described enable a recipient of a phone call to ensure that the call is initiated by the expected trusted enterprise organization and not a fraudulent actor posing as the enterprise organization. Accordingly, upon initiation of a communication from the enterprise organization to the user or customer, a validation action may be generated and sent to the customer via a different communication channel that the communication channel used to initiate the communication. Although aspects are generally described as sending the validation action via a second, different communication channel, one or more validation actions may be sent via one, two or more different communication channels that are separate and different from the communication channel used to initiate the communication.

In some examples, the validation action may be sent to the user as the call is initiated, in advance of the call being initiated to the user, or after a call has been initiated. For instance, in some examples, the enterprise organization may call the user and, after the user answers, the call may be paused while the validation action is transmitted to the user and acknowledged. In other examples, the validation action may be transmitted in advance of the call to indicate that a call will be forthcoming. Additionally or alternatively, the call may be initiated by the enterprise organization and paused before the connection is made while the validation action is transmitted to the user.

In some examples in which the enterprise organization is connected to the user and the call is paused for validation, the user may access a secure link or call a direct phone number previously provided to the user or accessible via a mobile or web-based application of the enterprise organization to confirm that the call is validated. This validation process may be performed prior to the user providing any information via the call. Further, the user may be encouraged or requested to log on to a mobile or web-based application to view a validation notification before proceeding further in the call.

Although various validation actions are described herein, the validation actions may each be used alone to validate a call for a user, or may be used in combination. For instance, a user may access a validation action through one or more communication channels and may provide acknowledgement through the one or more channels.

In some examples, the validation action may be transmitted to the user via different channels on a random or rolling basis. For instance, certain days, months, or the like, validation may be provided via a first arrangement (e.g., email)

and on other days, months or the like, validation may be provided via a different arrangement (e.g., mobile or web-based application). In some examples, the validation action may be transmitted via different channels for each call or communication to the user. This may add additional security against unauthorized users accessing information. In some examples, a validation action channel may be identified to the user via the web-based or mobile application. For instance, an indication of a channel being used for a particular day, month, or the like, may be communicated to the user via the user's home page on the mobile or web-based application.

In some examples, the user may customize or limit the channels used to provide the validation action. For instance, the user might not use a virtual assistant associated with the enterprise organization and, accordingly, may request that validation actions be transmitted via other channels (e.g., email, SMS, mobile application, or the like).

In some examples, customers or users may designate another user, an avatar or bot, or the like, to receive the validation action and acknowledge the validation action. Accordingly, the validation action may be sent to the trusted other user or bot and, if acknowledged, a notification may be transmitted to the user indicating that the call or connection was validated by the trusted other user or bot. Accordingly, the trusted other user or bot might not be a party to the communication or call between the enterprise organization and customer but, instead, may receive the validation action and acknowledge it for the customer prior to the customer engaging with the enterprise organization via the call.

Although several aspects discussed herein are provided in the context of two users, the arrangements described may be used to validate communications or calls between two, three or more users.

In some examples, transmitting the validation action may include transmitting a code (e.g., machine readable code, one time passcode, or the like) to one or both parties to the communication. The parties may the return the code to the communication validation computing platform as an acknowledgement and, if the code match or are as expected, the call may be enabled.

Additionally or alternatively, the computing platform may generate an image, portion of an image, unique audible sound, pre-arranged word or passphrase, or the like, that may be sent to one or more parties to the call. The image, portion of the image, unique audible sounds, pre-arranged word or passphrase, or the like may, in some examples, be unique to a user. The image, portion of the image, unique audible sounds, pre-arranged word or passphrase, or the like may be transmitted to one or more parties within the call as validation action which may be acknowledged by the user to continue the call (or ignored to terminate). In some examples, initiation of a call may prompt the customer and the associate making the call from the enterprise organization to send the image, portion of the image, unique audible sounds, pre-arranged word or passphrase, or the like may to the computing platform and, if a match exists, the call may be enabled. If a match does not exist, the call may be terminated. Aspects related to providing images or the like may be initiated by the user in response to receiving a call (e.g., the user may store the image and provide it when the call is received to the system that may then determine whether it matches an image received from the other party). In some examples, all parties to a call may have a portion of an image that must be transmitted to the computing platform to complete the image and enable the call.

As discussed, aspects provided are directed to providing validation of a call or other connection between two or more parties to ensure a call is received from a trusted enterprise organization rather than a fraudulent actor. Users may, in some examples, after a validated call is enabled, be required to provide authentication information to authenticate the user to the enterprise organization. However, the arrangements described herein provide for assurances that a call is originating from an expected entity.

Figure 6:
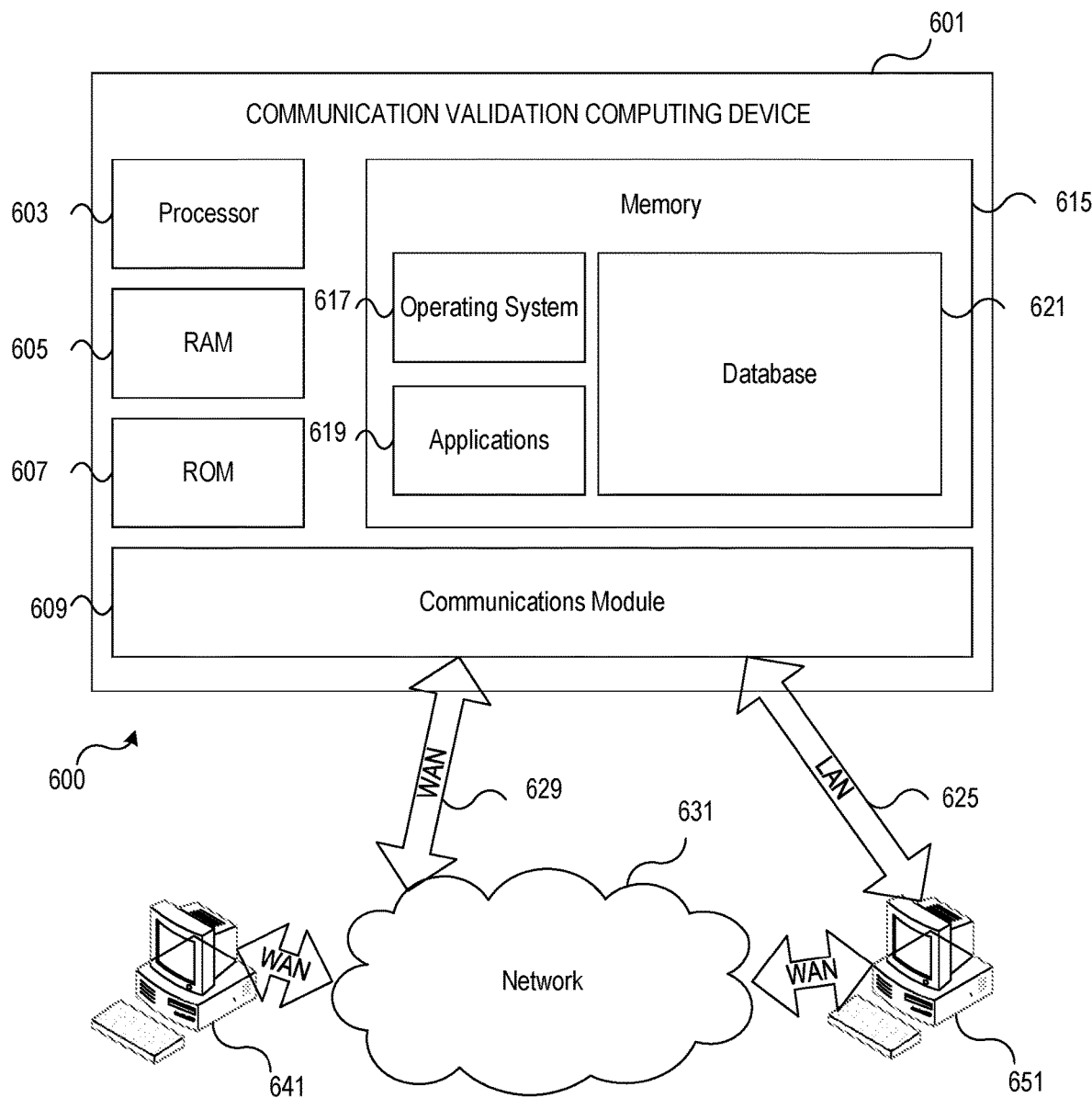
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include communication validation computing device 601 having processor 603 for controlling overall operation of communication validation computing device 601 and its associated components, including Random Access Memory (RAM) 605, Read-Only Memory (ROM) 607, communications module 609, and memory 615.

Communication validation computing device 601 may include a variety of computer readable media. Computer readable media may be any available media that may be accessed by communication validation computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by communication validation computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on communication validation computing device 601. Such a processor may execute computer-executable instructions stored on a computer-readable medium.

Software may be stored within memory 615 and/or storage to provide instructions to processor 603 for enabling communication validation computing device 601 to perform various functions as discussed herein. For example, memory 615 may store software used by communication validation computing device 601, such as operating system 617, application programs 619, and associated database 621. Also, some or all of the computer executable instructions for communication validation computing device 601 may be embodied in hardware or firmware. Although not shown, RAM 605 may include one or more applications representing the application data stored in RAM 605 while communication validation computing device 601 is on and corresponding software applications (e.g., software tasks) are running on communication validation computing device 601.

Communications module 609 may include a microphone, keypad, touch screen, and/or stylus through which a user of communication validation computing device 601 may provide input, and may also include one or more of a speaker for providing audio output and a video display device for providing textual, audiovisual and/or graphical output. Computing system environment 600 may also include optical scanners (not shown).

Communication validation computing device 601 may operate in a networked environment supporting connections to one or more other computing devices, such as computing device 641 and 651. Computing devices 641 and 651 may be personal computing devices or servers that include any or all of the elements described above relative to communication validation computing device 601.

The network connections depicted in FIG. 6 may include Local Area Network (LAN) 625 and Wide Area Network (WAN) 629, as well as other networks. When used in a LAN networking environment, communication validation computing device 601 may be connected to LAN 625 through a network interface or adapter in communications module 609. When used in a WAN networking environment, communication validation computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and a memory storing computer-readable instructions that, when executed by the at least one processor, cause the computing platform to:
  receive an indication of initiation of a communication session between a first party and a second party, wherein the communication session is initiated by the first party via a first party computing device and via a first communication channel that is a telephone channel;
  generate, in response to the received indication, a communication validation action, the communication validation action validating the first party initiating the communication session;
  after establishing the communication session, pause the communication session;
  after pausing the communication session, transmit, to the second party and via a second communication channel different from the first communication channel, the communication validation action, wherein transmitting the communication validation action causes display of a notification including the communication validation action on a second party computing device via the second communication channel;
  receive, from the second party computing device, user input responsive to the communication validation action, wherein the user input includes an indication of acceptance or rejection of the communication session by the second party;
  responsive to receiving the user input responsive to the communication validation action, generate a call completion instruction; and
  transmit the call completion instruction to the first party computing device, wherein transmitting the call completion instruction to the first party computing device causes the first party computing device to perform one of:
    resuming the initiated communication session between the first party and the second party, or
    terminating the initiated communication session between the first party and the second party.

2. The computing platform of claim 1, wherein the second communication channel is an email channel.

3. The computing platform of claim 1, wherein the second communication channel is a short message service (SMS) channel.

4. The computing platform of claim 1, wherein the second communication channel is one of: a mobile or web-based application associated with the first party.

5. The computing platform of claim 1, wherein the second communication channel is a virtual assistant associated with the first party.

6. The computing platform of claim 1, wherein the communication validation action includes a tonal key embedded in the initiated communication session.

7. The computing platform of claim 1, wherein the first party is an enterprise organization hosting the computing platform and the second party is a customer of the enterprise organization.

8. A method, comprising:
  receiving, by a computing platform, the computing platform having at least one processor and memory, an indication of initiation of a communication session between a first party and a second party, wherein the communication session is initiated by the first party via a first party computing device and via a first communication channel that is a telephone channel;
  generating, by the at least one processor and in response to the received indication, a communication validation action, the communication validation action validating the first party initiating the communication session;
  after establishing the communication session, pause the communication session;
  after pausing the communication session, transmitting, by the at least one processor and to the second party via a second communication channel different from the first communication channel, the communication validation action, wherein transmitting the communication validation action causes display of a notification including the communication validation action on a second party computing device via the second communication channel;
  receiving, by the at least one processor and from the second party computing device, user input responsive to the communication validation action, wherein the user input includes an indication of acceptance or rejection of the communication session by the second party;
  responsive to receiving the user input responsive to the communication validation action, generating, by the at least one processor, a call completion instruction; and
  transmitting, by the at least one processor, the call completion instruction to the first party computing device, wherein transmitting the call completion instruction to the first party computing device causes the first party computing device to perform one of:
    resuming the initiated communication session between the first party and the second party, or
    terminating the initiated communication session between the first party and the second party.

9. The method of claim 8, wherein the second communication channel is an email channel.

10. The method of claim 8, wherein the second communication channel is a short message service (SMS) channel.

11. The method of claim 8, wherein the second communication channel is one of: a mobile or web-based application associated with the first party.

12. The method of claim 8, wherein the second communication channel is a virtual assistant associated with the first party.

13. The method of claim 8, wherein the communication validation action includes a tonal key embedded in the initiated communication session.

14. The method of claim 8, wherein the first party is an enterprise organization hosting the computing platform and the second party is a customer of the enterprise organization.

15. One or more non-transitory computer-readable media storing instructions that, when executed by a computing platform comprising at least one processor, memory, and a communication interface, cause the computing platform to:
  receive an indication of initiation of a communication session between a first party and a second party, wherein the communication session is initiated by the first party via a first party computing device and via a first communication channel that is a telephone channel;
  generate, in response to the received indication, a communication validation action, the communication validation action validating the first party initiating the communication session;
  after establishing the communication session, pause the communication session;
  after pausing the communication session, transmit, to the second party and via a second communication channel different from the first communication channel, the communication validation action, wherein transmitting the communication validation action causes display of a notification including the communication validation action on a second party computing device via the second communication channel;

receive, from the second party computing device, user input responsive to the communication validation action, wherein the user input includes an indication of acceptance or rejection of the communication session by the second party;

responsive to receiving the user input responsive to the communication validation action, generate a call completion instruction; and transmit the call completion instruction to the first party computing device, wherein transmitting the call completion instruction to the first party computing device causes the first party computing device to perform one of:
- resuming the initiated communication session between the first party and the second party, or
- terminating the initiated communication session between the first party and the second party.

16. The one or more non-transitory computer-readable media of claim 15, wherein the first party is an enterprise organization hosting the computing platform and the second party is a customer of the enterprise organization.

* * * * *